United States Patent [19]

Hays et al.

[11] Patent Number: 4,545,669
[45] Date of Patent: Oct. 8, 1985

[54] LOW VOLTAGE ELECTROPHOTOGRAPHY WITH SIMULTANEOUS PHOTORECEPTOR CHARGING, EXPOSURE AND DEVELOPMENT

[75] Inventors: Dan A. Hays, Fairport; William H. Wayman, Macedon, both of N.Y.

[73] Assignee: Xerox Corporation, Stamford, Conn.

[21] Appl. No.: 582,108

[22] Filed: Feb. 21, 1984

[51] Int. Cl.⁴ .......................................... G03G 15/00
[52] U.S. Cl. ................................ 355/3 R; 355/3 BE; 355/16; 430/55
[58] Field of Search ................ 355/3 R, 3 BE, 3 DR, 355/16, 14 R, 14 D, 3 P; 430/55

[56] References Cited

U.S. PATENT DOCUMENTS

| | | | |
|---|---|---|---|
| 3,284,224 | 11/1966 | Lehmann | 117/17.5 |
| 3,308,233 | 3/1967 | Button et al. | 178/6.6 |
| 3,741,760 | 6/1973 | Snelling | 96/1.2 |
| 3,820,985 | 6/1974 | Gaynor et al. | 355/3 BE X |
| 3,853,397 | 12/1974 | Cantarano | 355/3 R |
| 3,857,549 | 12/1974 | Snelling | 355/3 P |
| 3,877,934 | 4/1975 | Schmidlin | 96/1.4 |
| 3,924,945 | 12/1975 | Weigl | 355/10 |
| 4,014,697 | 3/1977 | Schmidlin | 96/1.5 |
| 4,060,321 | 11/1977 | Butement | 355/3 P X |
| 4,084,896 | 4/1978 | Warter, Jr. et al. | 355/3 P |
| 4,130,359 | 12/1978 | Groner | 355/3 P |
| 4,167,326 | 9/1979 | Payne | 355/16 |
| 4,173,407 | 11/1979 | Kuehnle | 355/16 X |
| 4,174,903 | 11/1979 | Snelling | 355/3 CH |
| 4,289,837 | 9/1981 | Gundlach | 430/39 |
| 4,404,574 | 9/1983 | Burwasser et al. | 355/16 X |

Primary Examiner—A. C. Prescott
Attorney, Agent, or Firm—E. O. Palazzo

[57] ABSTRACT

This invention relates to an apparatus for simultaneously charging, exposing, and developing imaging members at low voltages which comprises a semi-transparent deflected flexible imaging member, an electronic imaging source means, a light beam deflector member, a modulator means, a laser means, a sensitizing roll means, containing magnets therein, a development roll means containing magnets therein, a voltage source means for the sensitizing roll means, a voltage source means for the development roll means, a developer supply reservoir containing conductive developer particles therein comprised of insulating toner resin particles and conductive carrier particles, a sensitizing nip situated between the flexible imaging member and the sensitizing roll, a development nip situated between the imaging member and the development roller, the sensitizing roll means and development roll means moving in the same direction of movement as the semi-transparent deflected flexible imaging member, the voltage being generated by the voltage source with the sensitizing nip being of an opposite polarity of the voltage generated by the voltage source for the development roller, wherein an electric field of a predetermined polarity is established between the semi-transparent deflected flexible imaging member and the sensitizing roll means, which field exerts in the sensitizing nip an electrostatic force on the charged toner particles causing these particles to uniformly migrate toward the imaging member, subsequently subjecting the deflected flexible imaging member to the electronic image source whereby the electrostatic force exerted on the toner particles adjacent the light struck areas of the flexible imaging member are increased thereby causing toner particles to be deposited on the deflected flexible imaging member, and wherein toner particles are removed from the deflected flexible imaging member in areas not exposed to light by the development roll and developed in the areas exposed to light.

31 Claims, 3 Drawing Figures

LOW VOLTAGE ELECTROPHOTOGRAPHY WITH SIMULTANEOUS PHOTORECEPTOR CHARGING, EXPOSURE AND DEVELOPMENT

BACKGROUND OF THE INVENTION

This invention generally relates to a process and apparatus for the formation and development of electrophotographic images at low voltages. More specifically, the present invention is directed to a process and apparatus for the simultaneous charging, exposure, and development of imaging members, at low voltages; and wherein a high voltage corona charging device is not required. Accordingly with the improved process of the present invention, the use of devices, such as corotrons, which require high voltages of from about 3,000 to about 6,000 are eliminated and the attendant problems thereto are substantially reduced, including the undesirable emission of ozone. The process and apparatus of the present invention are useful in electrostatographic imaging systems, particularly xerographic imaging systems wherein a high voltage corotron device is not needed for charging, and developed images of high quality and excellent resolution are obtained.

The formation and development of electrostatic latent images is well known. In these systems generally, a corotron charging device, requiring from about 3,000 to about 6,000 volts is used to apply a charge density to a photoreceptor member. Subsequently, the photoreceptor imaging member is imagewise exposed, and the resulting latent electrostatic image is developed with toner particles. Thereafter the image is transferred to a suitable surface with a high voltage corotron charging device, followed by permanently fixing the image to a suitable substrate such as paper. Since the introduction of xerography many improvements have been affected in order to obtain high quality developed images while simultaneously improving the process conditions. However, a substantial number of these systems continue to require corona charging devices necessitating the need for costly high voltage power devices and the elimination of undesirable ozone generated by such devices.

There is disclosed in U.S. Pat. No. 2,968,552, a process wherein a layer of charged conductive toner particles are uniformly developed on an imaging member, such as a photoreceptor containing a transparent substrate. According to the disclosure of this patent, development is caused by an electrical bias from a development roll in the absence of photoreceptor charging. Subsequent to imagewise exposure through the transparent substrate of the photoreceptor device, paper is brought into contact with the toned photoreceptor causing toner particles to selectively transfer to the paper in the unexposed or imaged areas.

Additionally, there is disclosed in U.S. Pat. No. 4,014,697 a process for obtaining images by contacting a charge blocking surface present on a photoreceptor device, with a developer composition containing charged toner particles, providing an electric field of predetermined polarity between the photoreceptor and the transfer medium for uniformly attracting the toner particles to the photoreceptor surface, and subjecting the photoreceptor surface to activating radiation in image configuration for inducing an electrostatic charge pattern on the photoreceptor near the interface between the blocking layer and the developer material. An electric field is provided of an opposite polarity between the photoreceptor and the transfer medium for the purpose of transferring the toner particles in image configuration. Similar teachings are contained in U.S. Pat. Nos. 3,877,934 and 3,890,040. These patents thus describe a process in which simultaneous photoreceptor charging and exposure are obtained with an in-place developer composition. In these processes, the electric field applied across an electroded sandwich comprised of a photoreceptor and a toned donor is of one polarity during imagewise exposure and of the opposite polarity during image development. Upon separation of the toned donor from the photoreceptor member, imagewise deposition of toner particles on the photoreceptor occurs in the exposed areas.

Moreover, in U.S. Pat. No. 4,174,903 there is disclosed an electrophotographic printing device wherein a single processing station charges a photoconductive member in one mode, and develops an image recorded thereon in another mode. The electrically biased charging development unit useful in this process charges the photoconductive member by brush contact with conductive particles.

While the processes and apparatus disclosed in the prior art are suitable for their intended purposes, there continues to be a need for improved xerographic imaging processes and apparatuses. More specifically there continues to be a need for improved processes and apparatuses wherein images can be generated and developed without high voltage corona charging devices. Furthermore, there continues to be a need for processes wherein images can be generated and developed in a simple and economical manner, and the need for controlling effluents emitted by corotrons, are substantially eliminated. Furthermore there continues to be a need for processes and apparatuses wherein images obtained by the deposition of charged conductive toner particles on an imaging member, and imagewise exposure through a transparent substrate contained on the member, include the scavenging of toner particles for the purpose of improving background development. This scavenging is effected by removing toner particles from the photoreceptor in the unexposed areas prior to allowing the imagewise toner layer to contact the print supporting member. Moreover, there continues to be a need for improved processes for simultaneously charging imaging members, and exposing these members with an in-place developer composition consisting of conductive particles obtained with two component developer mixtures, or conductive single component toner particles. In this embodiment, the conductive toner particles provide an intimate electrode for the imaging member, thereby increasing the efficiency of photoreceptor charging by imagewise light exposure. Additionally, there continues to be a need for processes and apparatus wherein a photoconductive member can be simultaneously sensitized and developed with a single processing station, thus eliminating the need for repeated cycling of this member.

SUMMARY OF THE INVENTION

It is an object of the present invention to provide a process and apparatus which overcomes the above noted disadvantages.

In a further object of the present invention there is provided a process and apparatus for the formation and development of images at low voltages.

In yet another object of the present invention, there is provided electrostatographic imaging processes and apparatus wherein simultaneous charging, exposure and development, is effected at low voltages, and high voltage corona charging devices are not required.

In still another object of the present invention, there is provided an apparatus containing a sensitizing roll for causing an electric field to be generated in a development nip.

A further object of the present invention resides in an electrostatographic development apparatus, wherein a development roll situated in close proximity to a sensitizing roll is used for scavenging residual toner particles from an imaging member.

In still another object of the present invention, there is provided an electrostatographic imaging process and apparatus wherein conductive developer particles provide an effective closely situated or coupled electrode for sensitizing the photoconductive member in one zone, and developing and scavenging toner particles in a second zone.

These and other objects of the present invention are accomplished by the provision of an imaging apparatus and process which enables simultaneous photoreceptor charging, exposure and development, without the need for high voltage charging devices. Accordingly, in the processes and apparatuses of the present invention as illustrated hereinafter, the electric field required by imagewise photoinduced charging of a photoconductive member is supplied by a biased magnetic brush of conductive developer particles in intimate contact with the imaging member. The conductive developer particles provide for high capacitance, and close coupling to the photoconductive imaging member. Furthermore, the close proximity of the conductive developer particles to the imaging member functions to reduce the dark decay of the imaging member, that is it increases the surface charge trapping thereof, of charge photoconducted to the surface of the photoconductor. A sufficiently close development electrode for this purpose is not disclosed in other prior art systems, especially wherein there is selected a donor electrode overcoated with a toner layer. However a sufficiently close electrode can be desirably achieved with conductive single component toner particles or conductive two-component developer particles as the electrode material for sensitizing the photoconductor.

In one embodiment of the present invention there is envisioned an apparatus and process which comprises providing a conductive two-component magnetic brush developer in rubbing contact with a photoconductor surface, and wherein the electric field for the photoinduced charging of the photoconductive member in a sensitizing zone is accomplished by an electrical bias of several hundred volts. An imagewise electrostatic charge pattern is formed at the surface of the photoconductor by rear exposure through a semi-transparent photoconductor support member, which rear exposure is particularly useful for electronic printing systems whereby a spatial/time dependent light source, such as a laser raster output scanner, light emitting diode array or the like is located within a rigid or flexible photoconductive device. However, rear exposure with a lens or fiber optics optical system with, for example, a scroll photoconductor is also feasible. When the bias on the magnetic brush of the conductive developer is of the same polarity as the charge contained on the toner particles, toner deposition onto the photoconductor occurs in both image (light exposed) and non-image areas. Thereafter, in accordance with the process and apparatus of the present invention, in a second development and scavenging zone, the bias on another magnetic brush of conductive particles is reversed or made near zero, for the purpose of allowing the toner particles to be scavenged or removed from the non-image areas of the photoconductive device. Relative motion between the photoconductive imaging member and developer particles is an important feature of the process and apparatus of the present invention particularly as it is applicable to increasing the scavenging rate, that is, the period within which undesirable toner particles are removed from the photoconductive member. Subsequent to transferring the image electrostatically to an image support member, such as paper, the residual toner on the photoconductor is removed by cleaning systems which can be located near the simultaneous charging, exposure, and development unit, reference FIG. 1.

There is also provided in accordance with the present invention an apparatus for simultaneously charging, exposing, and developing imaging members at low voltages comprised of a semi-transparent deflected flexible imaging member, an electronic imaging source means, a light beam deflector member, a modulator means, a laser means, a sensitizing roll means, containing magnets therein, a development roll means with magnets therein, a voltage source means for the sensitizing roll means, a voltage source means for the development roll means, a developer supply reservoir containing conductive developer particles therein comprised of insulating toner resin particles and conductive carrier particles, a sensitizing nip situated between the flexible imaging member and the sensitizing roll, a development nip situated between the imaging member and the development roller, the sensitizing roll means and development roll means moving in the same direction of movement as the semi-transparent deflected flexible imaging member, the voltage being generated by the voltage source for the sensitizing nip being of an opposite polarity of the voltage generated by the voltage source for the development roller, wherein an electric field of a predetermined polarity is established between the semi-transparent deflected flexible imaging member and the sensitizing roll means, which field exerts in the sensitizing nip an electrostatic force on the charged toner particles causing these particles to uniformly migrate toward the imaging member, subsequently subjecting the deflected flexible imaging member to the electronic image source whereby the electrostatic force exerted on the toner particles adjacent the light struck areas of the flexible imaging member are increased, thereby causing toner particles to be deposited on the deflected flexible imaging member, and wherein unused and/or residual toner particles are removed from the sensitizing roll and the deflected flexible imaging member by the development roll.

DESCRIPTION OF THE PREFERRED EMBODIMENT

The process and apparatus of the present invention and various alternative embodiments will now be described with reference to the following figures wherein.

Figure 1:
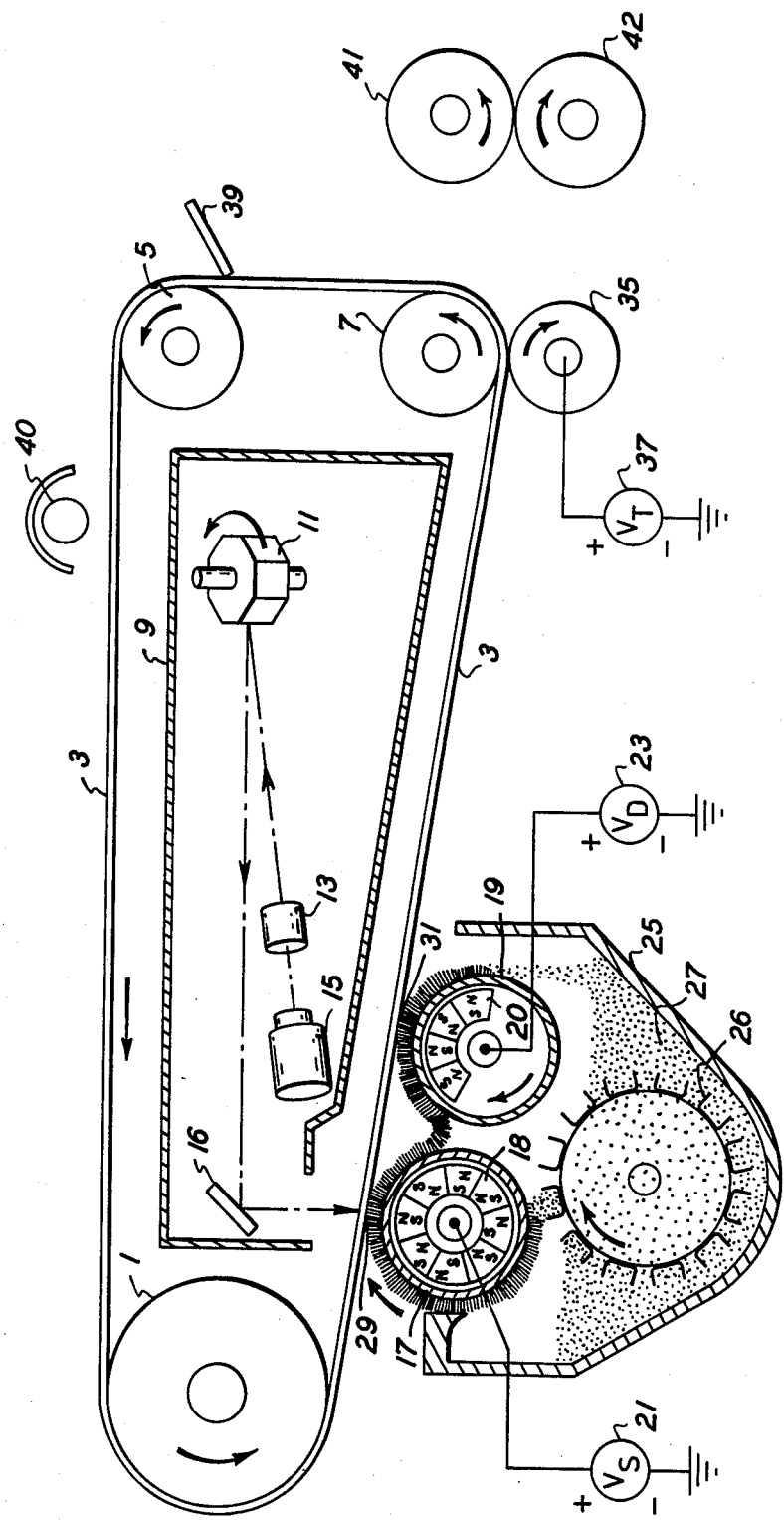
FIG. 1 is a schematic view of an embodiment of the process and apparatus of the present invention wherein a sensitizing roll and development roll means are illustrated.

Illustrated in FIG. 1 is the process and apparatus of the present invention containing a drive roll means 1, a semi-transparent deflected flexible imaging member 3, idler rolls 5 and 7, an electronic image source 9, a light bean deflector, such as a rotating polygon mirror 11, a modulator 13, a laser 15, such as a solid state gallium arsenide laser, a deflecting mirror 16 for purposes of changing the direction of the beam of light by 90 degrees downward, a sensitizing roll 17, magnets 18, a development roll 19, magnets 20, a voltage source $V_S$ 21, for the sensitizing roll 17, a voltage source $V_D$ 23, for the development roll 19, a developer supply reservoir 25, a paddle wheel 26, conductive developer particles 27, comprised of toner resin particles, and conductive carrier particles, a sensitizing nip 29, situated between the flexible imaging member 3, and the sensitizing roll 17, a development nip 31 situated between the imaging member 3 and development roller 19, a bias transfer roll 35, a voltage source $V_T$ 37, for the bias transfer roll 35, a cleaning doctor blade 39, erase lamp 40, and fuser rolls 41 and 42.

In accordance with the process and apparatus of the present invention, the imaging member 3 is sensitized by applying a bias to the developer composition thereby eliminating need for corona ions.

More specifically, in operation the process and apparatus of FIG. 1 functions as follows:

Conductive developer particles 27, containing a mixture of conductive magnetic carrier particles and insulating toner particles, present in the developer reservoir 25, are supplied to the sensitizing roll 17 by the paddle wheel 26. Magnets 18 attract the magnetic developer particles to the sensitizing roll wherein they are metered and transported to the sensitizing nip 29. In those situations wherein the insulative toner particles have a negative triboelectric charge, a negative voltage from the voltage source 21 as applied to the sensitizing roll typically is from about −100 volts to about −600 volts, and preferably is from about −300 volts to about −500 volts. With the absence of light exposure from the image source 9, negatively charged toner particles are deposited on the imaging member 3 in response to the negative bias voltage contained on the sensing roll 17. To sensitize or charge the imaging member for image development, light from the image source 9 is directed onto the imaging member 3, through a semi-transparent supporting layer. The image source 9 produces a narrow beam of light from laser 15, which is rapidly switched on and off by the modulator 13. The deflector 11 sweeps the modulated light beam across the mirror 16 and sensitizing nip 29. In regions where light is directed on the imaging member 3, photoinduced charge migration across the thickness of the imaging member is obtained in the presence of a sensitizing bias voltage applied to the sensitizing roll 17. For a negative voltage source 21, the electric field within the imaging member causes a photoinduced positive charge on the surface of the imaging member. The presence of photoinduced surface charge increases the deposition of negatively charged toner particles on the imaging member. In this embodiment, the ratio of the sensitizing roll surface speed to the imaging member speed is from about 1.5 to about 6 and preferably is from about 2 to about 4.

For the purpose of scavenging toner particles from the imaging member in the non-image or dark areas, and developing toner in the image or light struck areas, the toned imaging member is advanced to the development nip 31 situated between the imaging member 3 and development roll 19. The bias voltage from voltage source 23, differs from the bias of voltage source 21, in that it is about 0 to +100 volts. This reverse bias present on development roll 19 provides for the scavenging of toner particles from the imaging member 3 in the non-image, dark areas. The rate of toner scavenging can be improved by causing the development roll 19 and imaging member 3 to move at different speeds, that is, for example, from about 1.5 to about 6 and preferably from about 2 to about 4. Accordingly, in the image, light struck areas, a portion of the toner particles are removed from the imaging member 3 in the development nip 31, but a significant amount of toner particles remain since the imaging member surface was charged positively by the photoinduced charged migration across the imaging member. The toner particles remain on roll 19 in view of magnets 20, and these particles are released as the roll rotates.

The developed image advances to a transfer station wherein a bias transfer roll with a positive voltage source 37 attracts negatively charged toner particles from the imaging member 3 to an image support member such as paper. Heated fuser rolls 41 and 42 fuse the image to an imaging support member while the cleaning system 39 removes residual toner particles from the imaging member prior to neutralizing the residual charge on the imaging member with erase lamp 40, in preparation for the succeeding imaging cycle.

Figure 2:
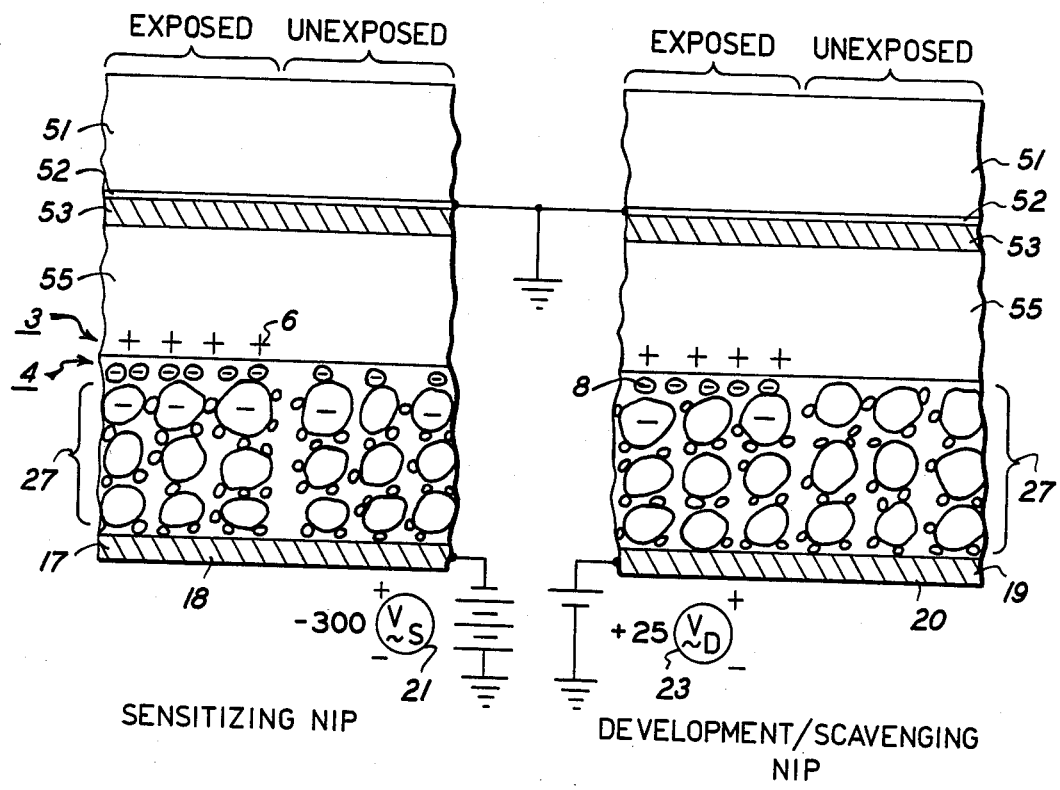
FIG. 2 illustrates the process and apparatus of the present invention with regard to the mechanisms involved at the sensitizing nip and scavenging nip subsequent to exposure of an imaging member.

Illustrated in FIG. 2 is the flexible transparent imaging member 3 of FIG. 1 containing a semi-transparent support member 51, a conductive layer 52, adjacent to the photoconductive layer 53 containing a photogenerating layer of trigonal selenium 30 percent by volume dispersed in 70 percent by volume of a polyvinyl carbazole binder, a hole transport layer 55, containing N,N'-diphenyl-N,N'-bis[3-methylphenyl] 1,1'-biphenyl-4,4'-diamine, 40 percent by weight, dispersed in a polycarbonate resinous binder 60 percent by weight, developer particles 27, containing insulating toner particles and electrically conductive carrier particles, sensitizing roll 17 containing magnets therein 18, development roll 19, containing magnets therein 20, and positive charges 6 and negative charges 8 as indicated. While it is not desired to be limited by theory, it is believed that with a negative bias voltage applied to the sensitizing roll 17, light exposure causes holes or positive charges to migrate to the surface of the hole transport layer 55, while in the unexposed areas positive charges are retained in the photogenerating layer. The electric field for photoinduced charge migration across the photoconductive imaging member is the result of about −300 volts being supplied by the voltage source $V_S$ to the sensitizing roll 17, which voltage also causes negatively charged toner particles 4, to be attracted to the positively charged image contained on the surface of the hole transport layer 55. Additionally toner particles 44 are attracted to the unimaged areas as illustrated in this Figure. The toner particles in non-imaged areas are scavenged from the imaging member 3 by subsequently applying a bias voltage to the development roll 19 of about +25 volts. The toner particles deposited on the imaging member, in the image, exposed areas, remain on the imaging member as the weak scavenging electrostatic forces from the development roll voltage source 23 cannot overcome the strong electrostatic force attracting the negatively charged toner particles to the photoinduced positive charge at the surface of the imaging member. Thus, the combination of a sensitizing nip and a development/scavenging nip enables imaging without the need for separate high voltage charging devices.

Figure 3:
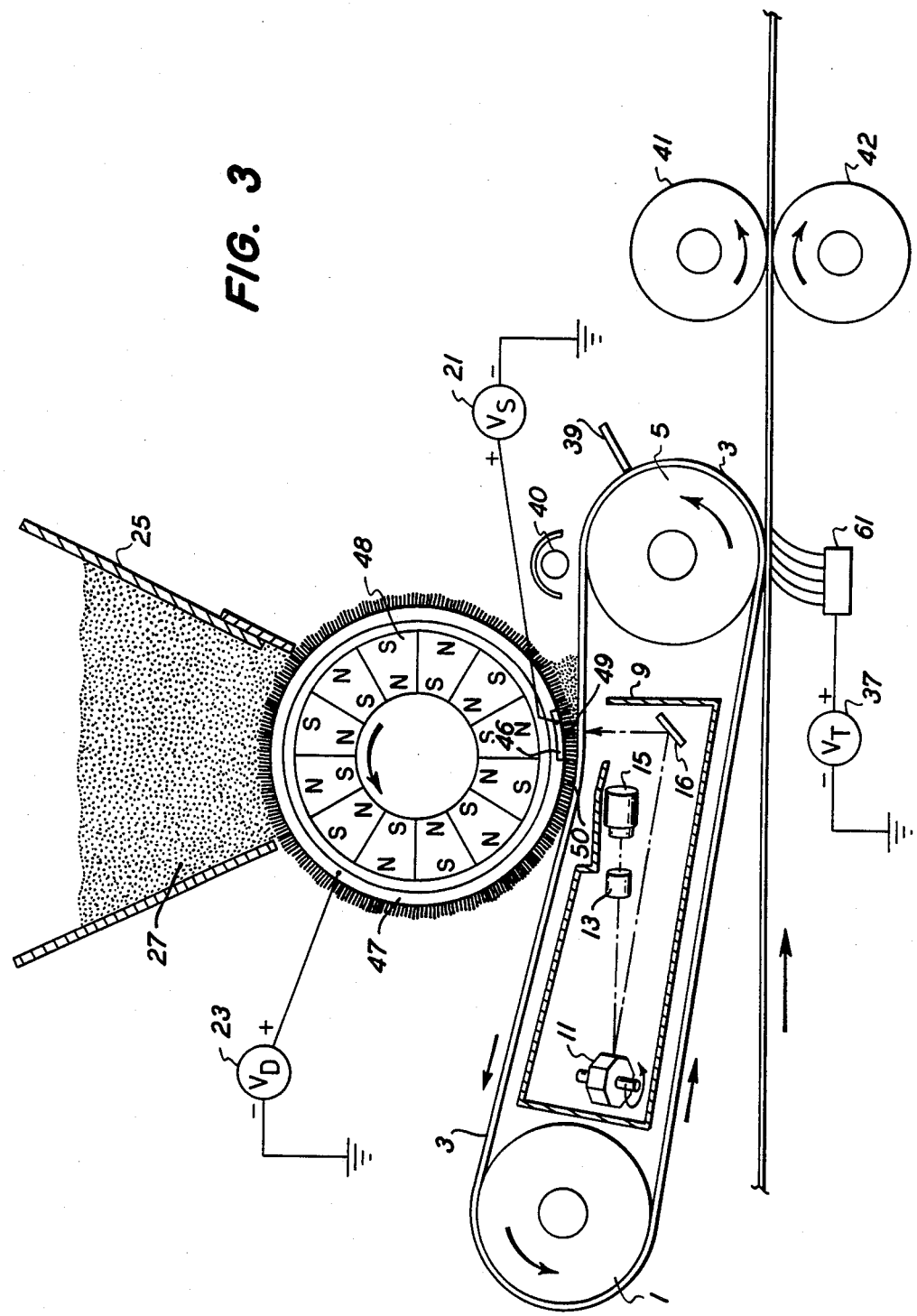
FIG. 3 is a schematic view of a further process and apparatus embodiment of the present invention wherein the sensitizing roll and development roll are contained in a single structure.

Illustrated in FIG. 3 is essentially the same apparatus as illustrated in FIG. 1 wherein like numbers represent like components. In this Figure, the sensitizing roll and development roll are combined into a single unit. There is thus illustrated a stationary shell 47 containing therein rotating magnets 48, wherein the sensitizing nip is designated as 49 and the development nip as 50. Additionally with regard to FIG. 3 there is shown a biased transfer brush 61 instead of a bias transfer roll 35 with regard to FIG. 1. With further regard to FIG. 3 the conductive developer particles 27, contain single component developer materials of conductive magnetically loaded toner particles. Clockwise transport of the particles 27 on a stationary sleeve 47 is accomplished by counter-clockwise rotation of the magnets 48. The sensitizing nip 49 and development nip 50 are formed by a partial wrap of the imaging member 3 around the sleeve 47, while the stationary shell 47 contains an electrically insulated strip 46 which serves as an electrode for the sensitizing nip 49. Operation of the apparatus illustrated in FIG. 3 is substantially similar to the operation of the apparatus as described here with reference to FIGS. 1 and 2, with the main exception that the conductive magnetizable single component toner particles replace a mixture of toner particles and conductive magnetizable carrier particles selected for use in the apparatus of FIGS. 1 and 2. The use of conductive single component toner particles provides an electrode closely coupled to the imaging member. Also, the conductivity of the toner particles causes induction charging of the toner layer adjacent to the imaging member. In the presence of a biased voltage between the electrode 46 and the conductive layer of the imaging member charge toner particles will be caused to adhere to the imaging member in both the image and non-image areas. The voltage source 21 in this embodiment typically applies a charge of from about −100 to about −600, and preferably from about −300 volts to about −500 volts.

Upon advancement of the toner imaging member to the development/scavenging nip 50, the toner particles in the non-image areas are scavenged since the voltage source 23 attached to the stationary shell 47 is maintained near zero, causing the toner particles in the non-image, unexposed areas to be neutralized, allowing for magnetic forces to scavenge the toner particles from the imaging member. Similarly in the imaged, exposed areas, the toner particles are not neutralized and the magnetic scavenging force is not sufficient to remove all of the toner particles from the imaging member, thus imaging is achieved with a combination of a sensitizing nip and a development/scavenging nip on one roll, without the need for high voltage charging devices as is commonly selected for sensitizing imaging members. The developed image advances to a transfer station where a bias transfer brush 61 with a positive voltage source 37 attracts negatively charged toner particles to an image support member, such as a dielectric coated paper. An insulative coated support member ensures efficient transfer of conductive toner particles, even at high humidity conditions. Heated fuser rolls 41 and 42 fuse the image to the imaging support member, while the cleaning system 39 removes residual toner particles from the imaging member prior to neutralizing the residual charge on the imaging member by erase lamp 40 in preparation for the succeeding imaging cycle.

Illustrative examples of flexible imaging members 3 include layered photoresponsive devices as described in U.S. Pat. No. 4,265,990 the disclosure of which is totally incorporated herein by reference. These layered devices are generally comprised of a substrate, a photogenerating layer, and a hole transport layer. The photogenerating layer usually contains a photosensitive pigment dispersed in an inactive resinous binder. As examples of photosensitive pigments there can be selected selenium, selenium alloys, trigonal selenium and the like. Examples of useful organic pigments include metal phthalocyanines, metal free phthalocyanines, squaraine compositions, vanadyl phthalocyanines, and the like. As resinous binders for the photogenerating pigment there can be selected polyvinyl carbazole, polyesters, polycarbonates, phenoxy resins, epoxy resins, and the like. As hole transport layers there is generally selected active diamine molecules such as those disclosed in the U.S. Pat. No. 4,265,990 patent, dispersed in resinous binders, in an amount of from about 40 percent to 70 percent by weight. Examples of resinous binders for the hole transport layer include polycarbonates, polyesters, phenoxy resins, and the like.

The imaging member is moving in the direction shown by the arrow in FIG. 1, generally at a speed of from about 1 to about 20 inches per second and preferably at a speed from about 2 to about 8 inches per second. Generally this member is moving in the same direction as the direction of movement of the sensitizing roll 17.

The sensitizing roll 17 can be comprised of various suitable substances subject to the provision that the resulting roll is conductive. Generally this roll is comprised of aluminum, stainless steel, or electroformed nickel. In those embodiments where the roll is caused to rotate, surface texturing is desirable for the purpose of aiding in the transport of the developer particles 27. The roll contains therein magnets for the purpose of attracting developer particles from the supply reservoir 25 and retaining these particles thereon as a result of the attractive forces between the magnets and the conductive magnetizable developer particles. These particles are maintained on the sensitizing roll 17 until they are presented to the imaging member in the charging nip 29 situated between the imaging member and sensitizing roll 17. As a result of a strong attractive force created by the electric field presented across the sensitizing nip, the toner particles contained on the sensitizing roll 17 are attracted both to the image and non-image areas present on the flexible imaging member 3.

Illustrative examples of materials used for the development roll 19 include aluminum, stainless steel or electroformed nickel, containing therein magnets 20 as shown, this roll moving in the same direction as the direction of movement of the sensitizing roll 17. As a result of the field created in the development nip 31, caused by the positive potential applied by the development power source $V_D$, toner particles contained primarily in the non-image areas are attracted to and deposited on the development roll 19.

The voltage source $V_S$ 21 provides a bias of from about −100 volts to −600 volts, and preferably from about −300 volts to about −500 volts, while the voltage source $V_D$ 23 for the development roll generates an bias of from about zero volts to about +100 volts, and preferably from about +25 volts to about +75 volts.

Illustrative examples of developer particles contained in the supply reservoir 25 include insulating toner resin particles and electrically conductive carrier particles, or single component conductive toner resin particles. Examples of insulating toner resin particles include those well know such as, those comprised of a vinyl polymers including styrene methacrylate polymers, styrene acrylate polymers, and the like. Additionally the toner particles can be comprised of styrene butadiene copolymers, polyester resins, particularly those resulting from the reaction product of a diol with a dicarboxylic acid, and the like.

As electrically conductive carrier particles there can be selected steel carrier particles, nickel carrier particles, ferrite particles overcoated with a polymer containing carbon black, and the like.

As examples of single component conductive toner particles there can be selected insulating resin toner particles as mentioned herein containing therein magnetites and conductive carbon black particles in an amount of from about 5 percent to about 15 percent by weight. In an alternative embodiment of the present invention, the carbon black particles can be heat spherodized onto the toner particles surface.

By conductive developer composition in accordance with the process and apparatus of the present invention is meant a developer composition with sufficient conductivity to allow current to pass through a layer of developer in a time which is much less than the dwell time of the developer in the sensitizing nip. The maximum developer conductivity is limited by the requirement for minimum current flow, and consequently, power dissipation in the developer between the sensitizing and development/scavenging nips.

The voltage $V_T$ applied to the bias transfer roller 35, ranges from about +800 volts to about +2,000 volts and preferably is from about +1,000 volts to about +1,500 volts.

The cleaning blade 39 can be comprised of numerous suitable substances which will remove any undesirable toner particles remaining on the imaging member subsequent to transfer of the image to a suitable substrate. Examples of cleaning members include polyurethane, Mylar and the like.

The erase lamp 40, which contains an incandescent lamp or electroluminescent panel is used primarily for the purpose of removing from the imaging member 3 any residual charges contained thereon.

With regard to the composite roll of FIG. 3, it is generally comprised of a smooth stationary shell 47 containing materials such as aluminum, stainless steel, electroformed nickel or the like having rotating magnets therein 48. The voltages $V_S$ and $V_D$ applied to this composite roll are described herein with reference to FIG. 1. Further the voltage $V_T$ applied to the transfer brush 61 is from about +800 volts to about +2,000 and preferably is from about +1,000 volts to about +1,500 volts. All other components, there direction of movement, and their function, is as described with reference to FIG. 1.

The process and apparatus described herein is illustrated with reference to particular photoreceptor structures and developer polarities, however, it should be understood that other alternative and equivalent structures and materials can be selected thereof. Thus, for example, when the imaging member contains a photogenerating layer overcoated on a hole (positive charge) transport layer, the polarity of the two component toner charge and the sensitizing and development/scavenging biases are reversed from those indicated in FIGS. 1, 2 and 3. Also, the systems described in FIGS. 1 and 3 represent positive to negative working systems since light exposure, (white input) produces a black output. Although these systems are well suited for printer applications, generally a positive to positive arrangement is preferred with an optical lens or fiber optics array input.

With further reference to FIG. 2, toner particle deposition does not occur during the sensitizing steps should the toner charge in the two component developer be positive. In the situation when the bias for the development source is a positive value, toner deposition will occur in the unexposed areas and will not result in the exposed area provided the positive electric potential of the charge photoinduced on the imaging member is greater than the electrode bias 23. Thus, in this situation, there is obtained a positive to positive image, which type of image is required for electrostatic copying machines.

The provision of a single device for simultaneously charging, exposing and developing an imaging member has a number of desirable advantages, including a reduction in cost in that separate subsystems for charging and development are replaced by one unit. Additionally, the simultaneous charge exposure and development as enabled by rear exposure with the process and apparatus of the present invention circumvents the need for multiple image member cycles as described in U.S. Pat. No. 4,174,903. Moreover, the presence of a double zone, reference the sensitizing nip and the development/scavenging nip, allows the achievement of high quality images on the imaging member prior to the transfer of the toned image to an image support such as paper, thus providing improved non-image control in comparison to a selective toner release process as illustrated, for example, in U.S. Pat. No. 2,968,552. Further, the use of conductive two component developer or conductive single component toner for sensitizing the imaging member represents an improvement over the processes as described in the prior art, since the conductive material provides close electrical coupling between the imaging member and sensitizing electrode, and the electrical coupling is improved over a sensitizing electrode covered with a layer of toner particles. Furthermore, the relative motion between the imaging member and the development/scavenging roll as illustrated herein improved the efficiency for removing toner particles in the non-image areas.

The present invention will now be illustrated with reference to the following examples, however it is not intended to limit the invention to the specific embodiments described.

EXAMPLE I

A hand-held magnetic brush of conductive developer was prepared by loading the developer on an electrically biased aluminum foil wrapped rubber magnet, which functions as a sensitizing electrode, or a development electrode, depending on the applied electrical bias. The toner composition contained 88 percent by weight of a styrene n-butylmethacrylate copolymer resin, (58 percent by weight of styrene, and 42 percent by weight of n-butylmethacrylate), 10 percent by weight of carbon black particles, and 2 percent by weight of the charge enhancing additive cetylpyridinium chloride. The developer composition selected contained about 3 parts by weight of the positively charged toner composition and 97 parts by weight of carrier particles, 30 microns in diameter, consisting of nickel. The imaging member consisted of a photogenerating layer of a selenium alloy overcoated on a hole transporting layer containing N,N'-diphenyl-N,N'-bis(3-methylphenyl)1,1'-biphenyl-4,4'-diamine, 40 percent by weight, dispersed in a polycarbonate resinous binder 60 percent by weight. The selenium layer was overcoated with a thin layer of Future wax to suppress charge injection between the selenium alloy and conductive nickel carrier. Light-exposed and unexposed areas were provided by masking the substrate of the semi-transparent support member. With the developer brush in contact with the imaging member and a bias of +300 volts applied to the aluminum foil electrode, which is now functioning as a sensitizing electrode, the imaging member was exposed to a light source. Subsequently when a bias of −10 volts was applied to the aluminum foil electrode, which is now functioning as a development electrode and the brush was removed in a sweeping sideways motion, a developed toner layer remained in the light-exposed area, whereas no toner remained in the unexposed areas.

EXAMPLE II

Images were obtained by repeating the procedure of Example I with the exception that the two-component developer composition selected was replaced with a single component conductive magnetic toner consisting of 48 percent by weight of a polyester resin obtained from the reaction of bis-phenol A, propylene glycol, and fumaric acid; 50 percent by weight of the magnetite particles Mapico Black, and 2 percent by weight of carbon black, heat spheroidized on the surface of the toner composition. In addition, images were obtained with the same single-component toner but with the organic flexible photoconductor of Example I, with the exception that the photogenerating layer was adjacent to the support member, reference FIGS. 1, 2 and 3. In this situation, a sensitizing bias voltage of −100 to −300 volts was applied to the aluminum foil electrode followed by a bias of zero for the development/scavenging step after exposure, and a developed toner layer remained in the light-exposed area, whereas no toner remained in the unexposed areas.

EXAMPLE III

A single-component development system was configured in a manner similar to that shown in FIG. 3 for simultaneous photoconductor charging, exposure and development, wherein the diameter of the aluminum stationary shell 47 was 1.25 inches. An eight pole magnet with a 600 gauss magnetic field strength was rotated at 750 rpm. A thin aluminum (1 mil) sensitizing electrode 46 was electrically insulated from the stationary shell. An insulative layer 2 mils thick and 70 mils wide followed the sensitizing electrode, which layer electrically isolated the sensitizing electrode from the stationary shell which served as the development/scavenging electrode. A trim blade spaced 15 mils from the stationary shell metered a layer of toner onto the shell from the toner sump 25. The toner consisted of 50 percent magnetite in a polyester resin heat spheroidized with 2 percent carbon black on the surface. The organic belt photoconductor selected consisting of a semi-transparent support member, a conductive layer, a photogenerating layer adjacent to the conductive layer and containing trigonal selenium 30 percent by volume dispersed in 70 percent by volume of a polyvinyl carbazole binder, and a hole transport layer, containing N,N'-diphenyl-N,N'-bis(3-methylphenyl)1,1-biphenyl-4,4'-diamine, 40 percent by weight, dispersed in a polycarbonate resinous binder 60 percent by weight partially wrapped around the toned stationary shell 47. With −400 volts applied to the sensitizing electrode 46, and +20 volts applied to the stationary shell 47, a positive-to-negative imagewise development onto the imaging member moving at a spaced of 12 inches per second was obtained by rear exposure with a light emitting diode array controlled by a microprocessor. Subsequently, the image was transferred to dielectric coated paper upon application of +1,000 volts to a bias transfer roll.

EXAMPLE IV

Positive-to-positive image development was obtained with the same materials, hardware and process as described in Example III with the exception that −250 volts was applied to the sensitizing electrode 46 and +120 volts was applied to the development/scavenging electrode 47. Image development was obtained in the unexposed areas and no development was obtained in the light exposed areas.

Other modifications of the present invention may occur to those skilled in the art based upon a reading of the present disclosure and these are intended to be included within the scope of the present invention.

We claim:

1. An apparatus for simultaneously charging, exposing, and developing imaging members at low voltages comprised of a semi-transparent deflected flexible imaging member, an electronic imaging source means, a light beam deflector member, a modulator means, a laser means, a sensitizing roll means, containing magnets therein, a development roll means with magnets therein, a voltage source means for the sensitizing roll means, a voltage source means for the development roll means, a developer supply reservoir containing conductive developer particles therein comprised of insulating toner resin particles and conductive carrier particles, a sensitizing nip situated between the flexible imaging member and the sensitizing roll, a development nip situated between the imaging member and the development roller, the sensitizing roll means and development roll means moving in the same direction of movement as the semi-transparent deflected flexible imaging member, the voltage being generated by the voltage source for the sensitizing nip being of an opposite polarity of the voltage generated by the voltage source for the development roller, wherein an electric field of a predetermined polarity is established between the semi-transparent deflected flexible imaging member and the sensitizing roll means, which field exerts in the sensitizing nip an electrostatic force on the charged toner particles causing these particles to uniformly migrate toward the imaging member, subsequently subjecting the deflected flexible imaging member to the electronic image source whereby the electrostatic force exerted on the toner particles adjacent the light struck areas of the flexible imaging member are increased, thereby causing toner particles to be deposited on the deflected flexible imaging member, and wherein toner particles are removed from the deflected flexible imaging member in areas not exposed to light by the development roll, and developed in the areas exposed to light.

2. An apparatus in accordance with claim 1 wherein the ratio of sensitizing roll surface speed to the imaging member speed is from about 1.5 to 6.

3. An apparatus in accordance with claim 1 wherein there is applied to the sensitizing roll member a voltage of from about −100 volts to about −600 volts, and the insulative toner particles are negatively charged.

4. An apparatus in accordance with claim 1 wherein the voltage supplied to the development roll is from about zero volts to about 100 volts.

5. An apparatus in accordance with claim 1 wherein the ratio of the speed of the development roll to the imaging member is from about 1.5 to 6.

6. An apparatus in accordance with claim 1 further including a transfer station wherein the developed image is caused to transfer to a suitable support medium, and subsequently fixing this developed image by heat.

7. An apparatus in accordance with claim 1 wherein the deflected flexible imaging member is comprised of a supporting substrate, a photogenerating layer, and an amine charge transport layer.

8. An apparatus in accordance with claim 7 wherein the photogenerating layer is comprised of trigonal selenium, metal phthalocyanines, metal-free phthalocyanines, or vanadyl phthalocyanines, optionally dispersed in an inactive resinous polymeric binder composition.

9. An apparatus in accordance with claim 7 wherein the charge transport layer contains N,N'-diphenyl-N,N'-bis-3-methylphenyl 1,1'-biphenyl-4,4'-diamine, dispersed in a resinous binder composition.

10. A method for obtaining developed electrostatic latent images with simultaneous charge, exposure, development, and cleaning, which comprises providing the apparatus of claim 1 forming an electrostatic latent image on the deflected flexible imaging member contained in said apparatus, developing this image with toner particles, and subsequently transferring the developed image to a suitable substrate.

11. A method of imaging in accordance with claim 10 wherein the imaging member is comprised of a supporting substrate, a photogenerating layer selected from the group consisting of trigonal selenium, metal phthalocyanines, metal-free phthalocyanines, and vanadyl phthalocyanines, optionally dispersed in an inactive resinous binder composition, and a diamine transport layer containing the diamine molecules dispersed in an inactive resinous binder.

12. A method of imaging in accordance with claim 10 wherein the insulating toner particles are comprised of a styrene methacrylate copolymer, a styrene butadiene copolymer, or a polyester composition, and there is included as an optional component in the toner composition a charge enhancing additive.

13. A method of imaging in accordance with claim 12 wherein the charge enhancing additive is an alkyl pyridinium halide.

14. A method of imaging in accordance with claim 13 wherein the alkyl pyridinium halide is cetylpyridinium chloride.

15. An apparatus in accordance with claim 1 wherein the sensitizing and development electrodes are positioned in close proximity on a stationary shell with an internal rotating magnetic assembly.

16. An apparatus in accordance with claim 1 wherein there is selected as developer particles a conductive single component toner comprised of resin particles and magnetite.

17. An apparatus in accordance with claim 15 wherein there is selected as developer particles a conductive single component toner comprised of resin particles and magnetite.

18. An apparatus in accordance with claim 16 wherein the developer particles are comprised of conductive single component composition containing toner resin particles and magnetite, with carbon black heat spheroidized on the surface thereof.

19. An apparatus in accordance with claim 17 wherein the developer particles are comprised of conductive single component composition containing toner resin particles and magnetite, with carbon black heat spheroidized on the surface thereof.

20. An apparatus in accordance with claim 15 wherein toner particles are removed by the development roller from the deflected flexible imaging member in areas exposed to light and developed in areas not exposed to light.

21. An apparatus in accordance with claim 16 wherein toner particles are removed by the development roller from the deflected flexible imaging member in areas exposed to light and developed in areas not exposed to light.

22. An apparatus in accordance with claim 1 wherein toner particles are removed by the development roller from the deflected flexible imaging member in areas exposed to light and developed in areas not exposed to light.

23. An apparatus for simultaneously charging, exposing, and developing imaging members at low voltages comprised of a semi-transparent deflected flexible imaging member, a light source means, an optical lens means, a sensitizing roll means, containing magnets therein, a development roll means with magnets therein, a voltage source means for the sensitizing roll means, a voltage source means for the development roll means, a developer supply reservoir containing conductive developer particles therein comprised of insulating toner resin particles and conductive carrier particles, a sensitizing nip situated between the flexible imaging member and the sensitizing roll, a development nip situated between the imaging member and the development roller, the sensitizing roll means and development roll means moving in the same direction of movement as the semi-transparent deflected flexible imaging member, the voltage being generated by the voltage source for the sensitizing nip being of an opposite polarity of the voltage generated by the voltage source for the development roller, wherein an electric field of a predetermined polarity is established between the semi-transparent deflected flexible imaging member and the sensitizing roll means, which field exerts in the sensitizing nip an electrostatic force on the charged toner particles causing these particles to uniformly migrate toward the imaging member, subsequently subjecting the deflected flexible imaging member to the optical image source whereby the electrostatic force exerted on the toner particles adjacent the light struck areas of the flexible imaging member are increased, thereby causing toner particles to be deposited on the deflected flexible imaging member, and wherein toner particles are removed from the deflected flexible imaging member in areas not exposed to light by the development roll, and developed in the areas exposed to light.

24. An apparatus in accordance with claim 23 wherein the sensitizing and development electrodes are positioned in close proximity on a stationary shell with an internal rotating magnetic assembly.

25. An apparatus in accordance with claim 23 wherein there is selected as developer particles a conductive single component toner comprised of resin particles and magnetite.

26. An apparatus in accordance with claim 24 wherein there is selected as developer particles a conductive single component toner comprised of resin particles and magnetite.

27. An apparatus in accordance with claim 25 wherein the developer particles are comprised of a conductive single component composition containing toner resin particles and magnetite, with carbon black heat spheroidized on the surface thereof.

28. An apparatus in accordance with claim 26 wherein the developer particles are comprised of a conductive single component composition containing toner resin particles and magnetite, with carbon black heat spheroidized on the surface thereof.

29. An apparatus in accordance with claim 24 wherein toner particles are removed by the development roller from the deflected flexible imaging member in areas exposed to light and developed in areas not exposed to light.

30. An apparatus in accordance with claim 25 wherein toner particles are removed by the development roller from the deflected flexible imaging member in areas exposed to light and developed in areas not exposed to light.

31. An apparatus in accordance with claim 23 wherein the toner particles are removed by the development roller from the deflected flexible imaging member in areas exposed to light and developed in areas not exposed to light.

* * * * *